(12) United States Patent
Berque

(10) Patent No.: US 7,003,728 B2
(45) Date of Patent: Feb. 21, 2006

(54) SYSTEM FOR KNOWLEDGE TRANSFER IN A GROUP SETTING

(76) Inventor: David Berque, 809 Sherwood Dr., Greencastle, IN (US) 46135

(*) Notice: Subject to any disclaimer, the term of this patent is extended or adjusted under 35 U.S.C. 154(b) by 776 days.

(21) Appl. No.: 09/899,431

(22) Filed: Jul. 3, 2001

(65) Prior Publication Data

Related U.S. Application Data

(60) Provisional application No. 60/257,531, filed on Dec. 21, 2000, provisional application No. 60/265,359, filed on Jan. 31, 2001.

(51) Int. Cl.
*G06F 3/00* (2006.01)

(52) U.S. Cl. ................................. 715/753; 715/751
(58) Field of Classification Search ............. 715/753, 715/705; 709/205, 204; 434/322, 350, 363; 708/162
See application file for complete search history.

(56) References Cited

U.S. PATENT DOCUMENTS

| 4,616,336 | A |   | 10/1986 | Robertson et al. |
| 4,716,404 | A |   | 12/1987 | Tabata et al. |
| 5,107,443 | A | * | 4/1992  | Smith et al. ............... 715/751 |
| 5,146,552 | A |   | 9/1992  | Cassorla et al. |
| 5,176,520 | A | * | 1/1993  | Hamilton ................... 434/350 |
| 5,211,564 | A |   | 5/1993  | Martinez et al. |
| 5,231,578 | A |   | 7/1993  | Levin et al. |
| 5,239,466 | A |   | 8/1993  | Morgan et al. |
| 5,274,362 | A |   | 12/1993 | Potvin |
| 5,309,555 | A | * | 5/1994  | Akins et al. ............... 715/756 |
| 5,353,398 | A | * | 10/1994 | Kitahara et al. ............ 715/759 |
| 5,524,240 | A | * | 6/1996  | Barbara et al. ................ 707/3 |
| 5,692,141 | A | * | 11/1997 | Kamisango et al. ........ 715/751 |
| 5,800,181 | A |   | 9/1998  | Heinlein et al. |
| 5,809,240 | A | * | 9/1998  | Kumagai ..................... 709/205 |
| 5,816,820 | A |   | 10/1998 | Heinz et al. |
| 5,823,788 | A |   | 10/1998 | Lemelson et al. |
| 5,859,974 | A | * | 1/1999  | McArdle et al. ............ 709/204 |
| 5,872,924 | A | * | 2/1999  | Nakayama et al. ......... 709/205 |
| 5,903,252 | A |   | 5/1999  | Ogata |
| 5,996,002 | A | * | 11/1999 | Katsurabayashi et al. ... 709/204 |
| 6,008,800 | A |   | 12/1999 | Pryor |

(Continued)

OTHER PUBLICATIONS

Streitz, Norbert et al., DOLPHIN: Intergrated meeting support across local and remote desktop environments and liveboards, 1994, ACM 0-=89791-698-1/94/0010 pp. 345-358.*

(Continued)

*Primary Examiner*—Ba Huynh
*Assistant Examiner*—Steven Theriault
(74) *Attorney, Agent, or Firm*—William F. Bahret

(57) ABSTRACT

A system for knowledge transfer in a group setting comprises a plurality of participant work areas and a moderator work area. Each of the plurality of participant work areas has at least one corresponding participant input-device, and each of the participant input-devices is adapted to define participant images that are then included on the corresponding participant work area. The moderator work area comprises at least one moderator input-device. The at least one moderator input-device is adapted to define moderator images that are then included on the moderator work area and to select moderator images that are then simultaneously included on each of plurality of participant work areas. The moderator input-device is further adapted to select participant images from any of the plurality of participant work areas that are then included on the moderator work area.

63 Claims, 5 Drawing Sheets

U.S. PATENT DOCUMENTS

| | | | |
|---|---|---|---|
| 6,038,684 A | 3/2000 | Liddell et al. | |
| 6,078,920 A | 6/2000 | Tan et al. | |
| 6,141,000 A | 10/2000 | Martin | |
| 6,141,529 A | 10/2000 | Remschel | |
| 6,148,174 A | 11/2000 | Remschel | |
| 6,151,621 A | 11/2000 | Colyer et al. | |
| 6,154,631 A | 11/2000 | Remschel | |
| 6,160,987 A | 12/2000 | Ho et al. | |
| 6,230,171 B1 * | 5/2001 | Pacifici et al. | 715/512 |
| 6,308,199 B1 * | 10/2001 | Katsurabayashi | 709/204 |
| 6,411,988 B1 * | 6/2002 | Tafoya et al. | 709/204 |
| 6,564,246 B1 * | 5/2003 | Varma et al. | 709/205 |

OTHER PUBLICATIONS

Abowd, Gregory et al., "Teaching and learning as multimedia authoring: The classroom 2000 project", 1996, ACM 0-89791-871-1/96/11 pp. 187-198.*

Abowd, Gregory et al., "Classroom 2000: A system for capturing and accessing multimedia classroom expriences", 1998, ACM 0-1-58113-028-7 pp. 20-21.*

Ishii et al., "Toward An Open Shared Workspace: Computer and Video Fusion Approach of Teamworkstation," *Communications of the ACM,* vol. 34, No. 12, Dec. 1991, pp. 37-50.

E. Hamilton, "Remote Sharing of Electronic Paper (SlateMate)," *Proceedings of the Tenth International Conference on Technology and Education,* Massachusetts Institute of Technology, Mar. 21-24, 1993, pp. 1068-1070.

M. Francis, "Students take note: Lectures may soon fall in your laptops," *Indianapolis Star,* Oct. 11, 1994, p. 1-2.

M. Geraghty, "Pen-Based Computer Seen as Tool to Ease Burden of Note Taking," *The Chronicle of Higher Education,* Nov. 9, 1994, p. A22.

J. Pierson, "Debbie Takes Notes So Students Can Think," *Wall Street Journal,* Dec. 9, 1994, p. B1.

D. Berque et al., "On the Progress of Developing Groupware to Support Notetaking," *Second Annual International Conference on the Learning Sciences,* Northwestern University, Evanston, Illinois, Jul. 25-27, 1996, pp. 345-350.

J. Fekete et al., "Using the Multi-Layer Model for Building Interactive Graphical Applications," 9th *Annual Symposium for User Interface Software and Technology,* Seattle, Washington, Nov. 6-8, 1996, pp. 109-118.

D. Berque et al., "Electronic Classrooms: A Prototype Using Laser Whiteboards and Pen Based Computers," *The Fourteenth International Conference on Technology and Education,* Oslo, Norway, Proceedings vol. 1, Aug. 10-13, 1997, pp. 231-233.

D. Berque et al., "Using a Variation of the WYSIWIS Shared Drawing Surface Paradigm to Support Electronic Classrooms," *Proceedings of Human-Computer Interaction '99,* 8th *International Conference on Human Computer Interaction,* Munich Germany, Aug. 22-27, 1999 (2 pages).

Press release, "DePauw University's DEBBIE Project Enhances Collaborative Interactive Education in the Classroom," c. Jan. 2000 (5 pages).

D. Berque et al., "The Design of an Interface for Student Note Annotation in a Networked Electronic Classroom," *Journal of Network and Computer Applications,* vol. 23, No. 2, Apr. 2000, pp. 77-91.

L. Anderson, "'Noteless' Classroom of the Future Technology Makes Teaching and Learning More Personal," *DePauw Magazine* [online], Spring 2000 (4 pages) [retrieved Dec. 21, 2000]. Retrieved from the Internet: <http://www.depauw.edu/pa/magazine/spring2000/news/debbie.asp>.

L. Dye, "Put Away That Pen and Paper, Electronic Blackboard Frees The Mind," ABC News Internet Ventures [online], © 1999 [retrieved Aug. 28, 2003]. Retrieved from the Internet: http://abcnews.go.com/sections/dyehard/dye29.html> (3 pages).

"Dave Berque '85 Named Professor of the Year," Haverford Online Magazine [online], Haverford College, Spring 1998 [retrieved on Dec. 19, 2003]. Retrieved from the Internet: <http://www.haverford.edu/publications/spring98/athc2.html>.

* cited by examiner

| OBJECT SELECTION | OBJECT SEQUENCE ON A PANEL | PANEL APPEARANCE ON A SURFACE |
|---|---|---|
|  (CIRCLE) |  |  |
|  (LINE) |  |  |
|  (LINE) |  |  |
|  (FREE HAND PEN) |  |  |
|  (ERASE) |  |  |
|  (LINE) |  |  |
|  "HELLO WORLD" (FREE FORM TEXT) |  |  |

SYSTEM FOR KNOWLEDGE TRANSFER IN A GROUP SETTING

CROSS-REFERENCE TO RELATED APPLICATIONS

This application claims the benefit of U.S. Provisional Patent Application Ser. No. 60/257,531, filed Dec. 21, 2000, and U.S. Provisional Patent Application Ser. No. 60/265,359, filed Jan. 31, 2001.

GOVERNMENT RIGHTS

This invention was made with government support under Grant Nos. CDA-9322371 and CDA-9619861 awarded by the National Science Foundation. The government has certain rights in the invention.

BACKGROUND

Software that supports cooperative work, often called groupware, generally employs work surfaces that function according to the "What you see is what I see" ("WYSIWIS") paradigm. This means that whenever a group of users is using such software, each has the same view. Anything written by one of the users is immediately seen by everyone else. Although the WYSIWIS paradigm has been the central idea behind most shared work surface groupware, deviations from a strict interpretation of some aspects of this paradigm have sometimes been considered.

For example, users may be distracted by a strict adherence to the WYSIWIS "simultaneity constraint." Consider a group member who is drawing a rectangle on the shared work surface. The other group members may find it distracting to watch the fine grain updates that transpire as the rectangle is sized and placed. Therefore, it may be more appropriate for the system to delay the process of updating the other displays until the size and placement of the rectangle have been finalized, even though this implies the users will not always have identical views of the shared work surface.

Another example of an advantageous relaxing of strict adherence to the WYSIWIS paradigm is permitting the shared work surface to exceed the size of what can be displayed at one time, and permitting individual users to select which portion is displayed at their workstation.

In many situations the members of a group employing a groupware system do not all have a common role. For example, one valuable use of groupware is as a teaching aid in a classroom. In this situation, a teacher or professor has the primary responsibility for selecting the subject matter and directing the discussion. It is therefore advantageous for this person to have additional means of reviewing and selecting the contributions from the other group members for the purpose of providing those that are likely to be most helpful to the discourse.

What is needed, therefore, is a system for sharing knowledge that uses a relaxed version of the WYSIWIS paradigm to further facilitate the efficient transfer of useful information, while filtering out information that is not useful or distracting. The present invention is directed towards meeting this need.

SUMMARY OF THE INVENTION

A first embodiment system for knowledge transfer in a group setting comprises: a plurality of participant work areas and a moderator work area. Each of the plurality of participant work areas has at least one corresponding participant input-device, and each of the participant input-devices is adapted to define participant images that are then included on the corresponding participant work area. The moderator work area comprises at least one moderator input-device, the at least one moderator input-device being adapted to define moderator images that are then included on the moderator work area and to select moderator images that are then simultaneously included on each of plurality of participant work areas. The moderator input-device is further adapted to select participant images from any of the plurality of participant work areas that are then included on the moderator work area.

A second embodiment system for knowledge transfer in a group setting comprises: a plurality of participant work stations and a moderator work station. Each of the participant work stations comprises: a participant work area; a participant input device, and a participant display element. The participant input-device is adapted to define participant images that are then included on the corresponding participant work area, the participant images being able to be defined by at least text objects, draw objects, erase objects, and bitmap objects. The participant display element is adapted to display the corresponding participant work area. The moderator work station comprises: a moderator work area, at least one moderator input-device, and a moderator display element. The at least one moderator input-device is adapted to define moderator images that are then included on the moderator work area and on each of plurality of participant work areas, the moderator images being able to be defined by at least text objects, draw objects, erase objects, and bitmap objects. The moderator display element is adapted to display the moderator work area. The moderator input-device is further adapted to select participant images from any of the plurality of participant work areas that are then included on the moderator work area. The work areas comprise a scroll of panels, each panel being permitted to have a size exceeding that which can be displayed on the display elements. The plurality of display elements are substantially located to permit a user to simultaneously view one of the display elements and to hear substantially every other user that is viewing another of the display elements. Additional participant work stations can be added to the system while the system is in use.

A third embodiment system for knowledge transfer in a group setting comprises a plurality of work areas, each comprising a public scroll and a private scroll, and wherein one of the plurality of work areas is a moderator work area.

A fourth embodiment comprises a network of computers programmed for knowledge transfer in a group setting, the network comprising: a plurality of participant workstations and a moderator workstation. Each of the participant workstations is programmed to provide a participant work area and has at least one corresponding participant input-device. Each of the participant input-devices is adapted to create data structures defining participant images that are then included in the participant work area. The moderator workstation is programmed to provide a moderator work area and comprises at least one moderator input-device. The at least one moderator input-device is adapted to: create data structures defining moderator images that are then included in the moderator work area; and to select moderator images that are then simultaneously included on each of plurality of participant work areas. The moderator input-device is further adapted to select participant images from any of the plurality of participant work areas that are then included on the moderator work area.

A fifth embodiment comprises a network of computers programmed for knowledge transfer in a group setting, the network comprising: a plurality of participant workstations and a moderator workstation. Each of the participant workstations is programmed to provide a participant work area and has at least one corresponding participant input-device. Each of the participant input-devices is adapted to create data structures defining participant images that are then included on the participant work area. The moderator workstation is programmed to provide a moderator work area and comprises at least one moderator input-device. The at least one moderator input-device is adapted: to create data structures defining moderator images that are then included on the moderator work area; and to select moderator images that are then simultaneously included on each of plurality of participant work areas. The moderator work area comprises a moderator public scroll and a moderator private scroll, and each participant work area comprises a participant public scroll and a participant private scroll. Each participant workstation displays images placed on the participant's public scroll by the moderator superimposed on images placed on the participant's public scroll by the participant. The moderator input-device is further adapted to select participant images from any of the plurality of participant work areas that are then included on the moderator work area.

A sixth embodiment comprises a network of computers programmed for knowledge transfer in a group setting, the network comprising: a plurality of participant workstations and a moderator workstation. Each of the participant workstations is programmed to provide a participant work area and has at least one corresponding participant input-device. Each of the participant input-devices is adapted to create data structures defining participant images that are then included on the participant work area. The moderator workstation is programmed to provide a moderator work area and comprises at least one moderator input-device. The at least one moderator input-device is adapted to: create data structures defining moderator images that are then included on the moderator work area; and to select moderator images that are then simultaneously included on each of plurality of participant work areas. The moderator work area comprises a shared work area and a moderator private work area, and each participant work area comprises a participant public work area and a participant private work area. Each participant work station displays images placed on the shared work area superimposed on images placed on the participant public work area. The moderator input-device is further adapted to select participant images from any of the plurality of participant work areas that are then included on the moderator work area. The network can be used in a group mode and a standalone mode. The workstations are located such that a first user positioned to use a workstation and a second user positioned to use a different workstation can hear each other speak.

A seventh embodiment comprises a network of computers programmed for knowledge transfer in a group setting, the network comprising: a plurality of participant workstations and a moderator workstation. Each of the participant workstations is programmed to provide a participant work area and has at least one corresponding participant input-device. Each of the participant input-devices is adapted to create data structures defining participant images that are then included on the participant work area. The moderator workstation is programmed to provide a moderator work area and comprises at least one moderator input-device. The at least one moderator input-device is adapted to: create data structures defining moderator images that are then included on the moderator work area; and to select moderator images that are then simultaneously included on each of plurality of participant work areas. The moderator work area comprises a shared work area and a moderator private work area, and each participant work area comprises a participant public work area and a participant private work area. Each participant workstation displays images placed on the shared work area by the moderator superimposed on images placed in the participant public work area. The moderator input-device is further adapted to select participant images from any of the plurality of participant work areas that are then included on the moderator work area. The network can be used in a group mode and a standalone mode. Every user positioned to use a workstation can hear every other user positioned to use any other workstation. Data structures defining the images are organized in notebook files comprising at least one panel and are stored as at least one object in a single panel.

An eighth embodiment comprises a network of computers programmed for knowledge transfer in a group setting, the network comprising: a plurality of participant workstations and a moderator workstation, and collision-correction functionality. Each of the participant workstations is programmed to provide a participant work area and has at least one corresponding participant input-device. Each of the participant input-devices is adapted to create data structures defining participant images that are then included on the participant work area. The moderator workstation is programmed to provide a moderator work area and comprises at least one moderator input-device, the at least one moderator input-device being adapted to: create data structures defining moderator images that are then included on the moderator work area, and to select moderator images that are then simultaneously included on each of the plurality of participant work areas. The moderator work area comprises a shared work area and a moderator private work area, and each participant work area comprises a participant public work area and a participant private work area. Each participant workstation displays images placed on the shared work area by the moderator superimposed on images placed on the participant public work area. The participant work area comprises a participant public scroll and a participant private scroll, the participant public scroll comprising data structures defining images placed on the shared work area and the participant's public work area. The moderator input-device is further adapted to select participant images from any of the plurality of participant work areas that are then included on the moderator work area. A participant must decide to permit an image to be selected by the moderator input-device before it can be included on the moderator work area. The network can be used in a group mode and a standalone mode. Every user positioned to use a workstation can hear every other user positioned to use any other workstation.

A ninth embodiment system for knowledge transfer in a group setting comprises: a plurality of participant work stations and a moderator work station. Each of the participant work stations comprises: at least one participant display device; at least one input device; a participant public scroll; and a participant private scroll. The at least one participant input device is adapted to permit the participant to create data structures on the participant public scroll and participant private scroll defining images that are displayed on the at least one participant display device. The moderator work station comprises: at least one moderator display device; at least one moderator input-device; a moderator public scroll. The at least one moderator input-device is adapted to create data structures on the moderator public scroll and each of the participant public scrolls defining images that are displayed on the at least one moderator display device and on each of the at least one participant display devices.

DETAILED DESCRIPTION OF THE PREFERRED EMBODIMENT

Figure 1:
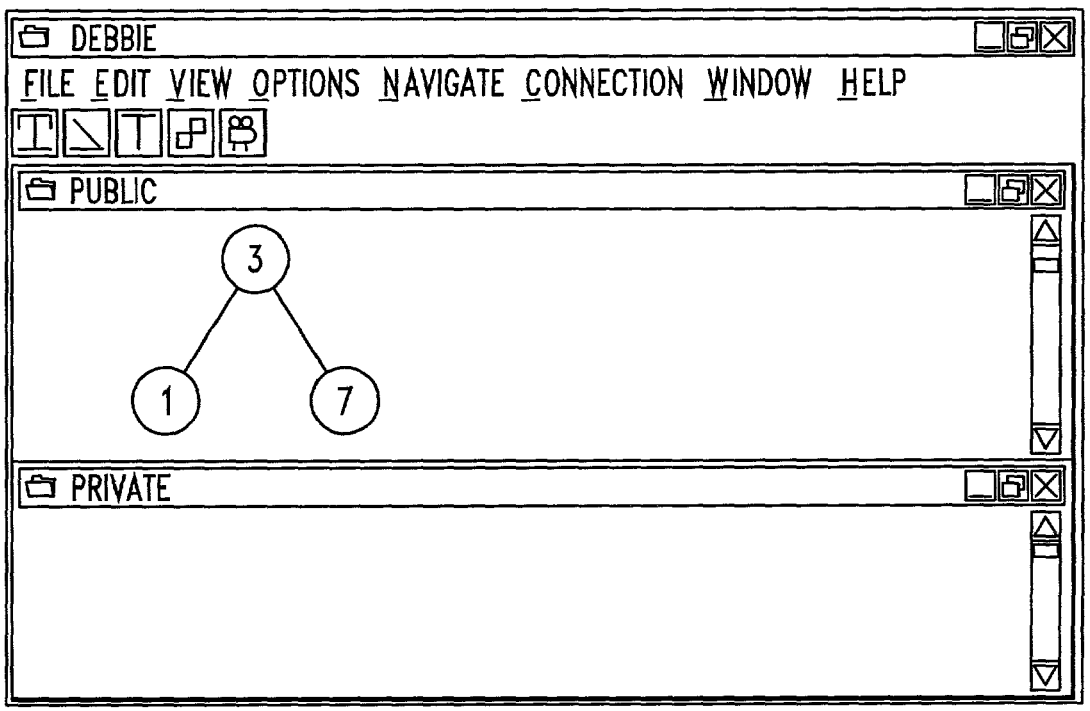
FIG. 1 is an example of an image of a binary search tree that has been placed on a shared work area.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A preferred embodiment system of knowledge transfer in a group setting according to the present invention employs a What-You-See-Is-What-I-See-One-Way ("WYSIWISOW") paradigm. The WYSIWISOW paradigm is characterized by inclusion of a moderator workstation and participant workstations in a shared work surface system. The moderator workstation makes available to a user, called the moderator, additional functionality that is not available through the participant workstations to their users, known as participants.

Figure 3:
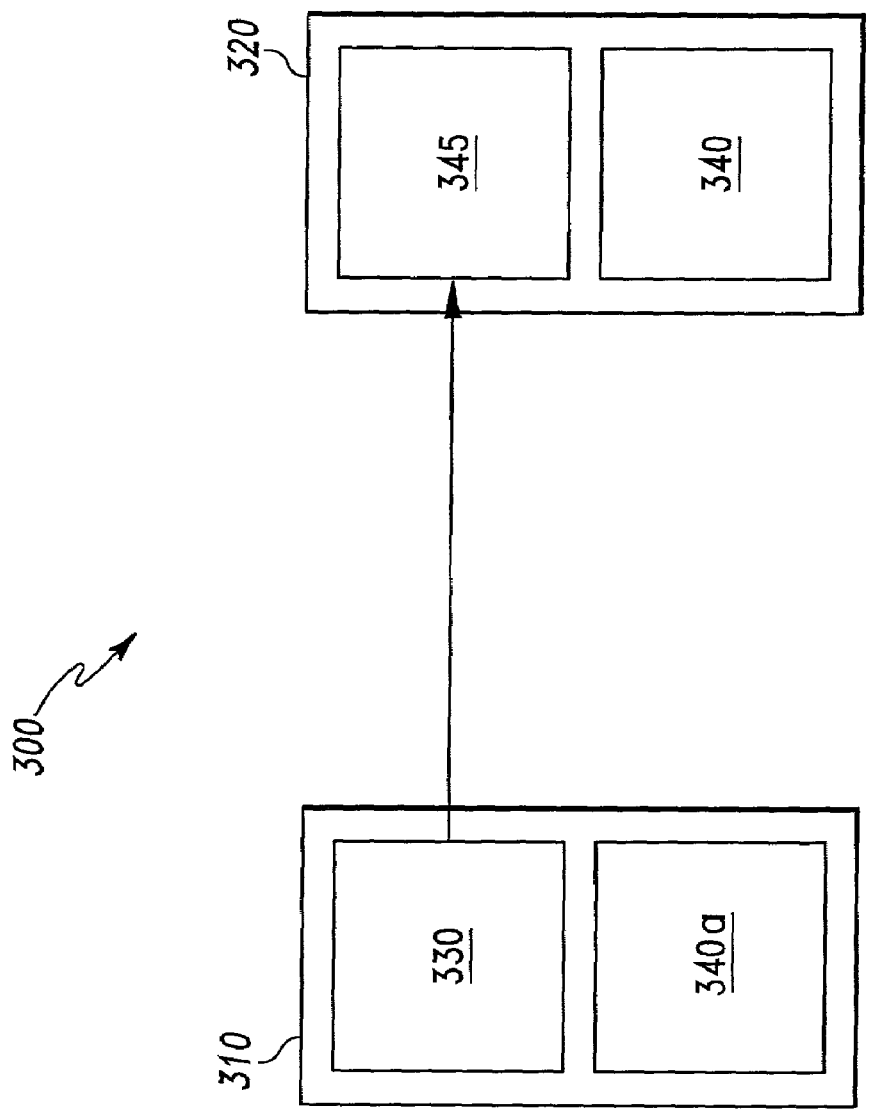
FIG. 3 is a diagram of certain elements of a group work area according to the present invention.

The preferred embodiment system comprises a group work area. FIG. 3 illustrates the relationship between certain elements of the group work area of the presently preferred embodiment, shown generally at 300. The group work area 300 comprises at least one moderator work area 310 and at least one participant work area 320, and a shared work area 330 and a plurality of private work areas 340, one corresponding to each workstation—including one moderator private work area 340a. The moderator adds images to the group work area 300 by adding them to the moderator work area 310, while participants add images to the group work area 300 by adding them to their participant work area 320.

In the preferred embodiment, the moderator work area 310 comprises a shared work area 330 and a moderator private work area 340a. Similarly, in the preferred embodiment, each participant work area 320 comprises a participant public work area 345 and a participant private work area 340. When the moderator adds images to the shared work area 330, they are simultaneously displayed at each participant's workstation (and the moderator work station). When the moderator places images on the moderator private work area 340a, they are displayed at the moderator workstation, but they are not generally displayed at any participant's workstation. In certain alternative embodiments, the moderator work area 310 does not include a moderator private work area 340a.

When a participant adds images to the group work area 300, they are added either to that participant's public work area 345 or that participant's private work area 340. Images placed on a participant's public work area 345 are typically displayed superimposed on images on the shared work area 330, while images placed on a participant's private work area are generally not. (In some situations it may make a difference what order such objects are "stacked" in—e.g., when the images involve different colors. "Superimposed," in this context, is not meant to indicate which image is placed "on top" of which. In certain embodiments, the images on the participant public work area 345 are always placed "on top" of those on the shared work area 330, while in others the opposite is true. In certain other embodiments, the images on the shared work area 330 and participant public work area 345 are always "stacked" in the order in which they are created. In still other embodiments, the order in which these images are "stacked," can vary, for example at the selection of the participant.) The images on each participant work area 320 are typically initially displayed only at that participant's workstation. In certain embodiments, the moderator may, however, view any of the participant work areas 320, including private work areas 340, at the moderator workstation, and may select images from a participant work area 320 to be included in the shared work area 330, thereby causing them to be displayed at each workstation.

A preferred embodiment system according to the present invention can be used in group mode or standalone mode. Typically, the system is used in group mode to initially aid in the transfer of information between users. Standalone mode can be used during follow up activities in which, for example, the moderator may check work that was produced while the system was used in group mode. During group use, images are placed on the group work area 300. The group work area 300 can be reviewed by individual users later, in standalone mode, in order to aid in retention and understanding of the information transferred. Standalone mode can also be used prior to a group use session, for example to prepare images for placement on the public scroll.

When used in group mode, the group typically discusses a subject, in order for the moderator to provide information to the participants about that subject. The moderator typically augments verbal statements by placing images on the shared work area 330 which he or she expects to aid the participants in more fully understanding those statements. For example, if the subject being discussed is chemistry, the images might include chemical symbols or equations. For another example, if the subject being discussed is the Pythagorean Theorem, the moderator might provide a diagram of a right triangle. The participants can supplement the images provided by the moderator with images that the participant believes might be helpful for remembering the relevance of the images selected by the moderator. For example, a participant might add a caption labeling one side of the right triangle "hypotenuse." This caption would become part of that participant's surface 320, and would generally be displayed only at that participant's workstation. Note that the group work area 300 can be used in environments where the workstations are located such that the users can speak directly to one another—for example, in a classroom—or in environments where some means of transmitting audio are necessary—such as a virtual classroom, in which various users are located remotely, and are connected via the Internet. The group work area 300 can also be used in environments in which the users cannot hear each other at all, such as when, for example, the users rely completely on the group work area 300 for the transmission of information during the group mode session.

It will be appreciated by those skilled in the art that, because the moderator does not normally see images placed on a participants' surface 320, it is possible that the moderator will subsequently place an image on the shared work area 330 which is superimposed on one or more images that participants have placed on their participant public work area 345. This problem is known as "collision." There are two general strategies for coping with collision: collision correction and collision avoidance.

Collision correction functions to permit users to work around the collisions that occur. For example, in certain alternative embodiments each workstation includes functionality that permits toggling between three view modes: one in which only the shared work area 330 is displayed, one in which only the participant public work area 345 is shown, and one in which both are superimposed. In these embodiments, although the last of these modes might include collisions, by toggling between the other two, a participant can view any image on either their public work area 345 or the shared work area 330 without the collisions.

Another collision correction strategy involves including functionality at each workstation that permits the participants to relocate images on the participant work area 320 that have become involved in collisions. In certain embodiments, the colliding images are relocated automatically when a collision occurs.

Collision avoidance, on the other hand, functions to reduce or eliminate the probability of collisions occurring in the first place. For example, in certain embodiments a participant's public work area 345 includes an area (such as a margin or window) that does not have a corresponding location on the shared work area 330. Thus, a participant can add images to this area and be assured that no collisions will occur.

In the presently preferred embodiment, participant workstations include functionality that permits the participant to place footnote images on the public scroll 345 and private scroll 340. These footnote images provide a link between images on a participant's public work area 345 or the shared work area 330, and the private scroll 340, and vice versa. Preferably, these footnote images can also provide a link between images on a participant's public work area 345 or the shared work area 330 and some other virtual location. For example, such a footnote image might provide a link to a computer file, or to a URL for a website containing information the participant believes relevant. Preferably, participants can also add images to their private scroll 340 without regard to the danger of future collisions. Thus, a participant can, for example, place smaller annotations directly on their public work area 345, while placing larger annotations, with their correspondingly larger danger of generating future collisions, in a footnote. In the presently preferred embodiment, the footnote images include means to display the corresponding images. For example, if the corresponding images are located in the participant's private work area 340, the footnote image preferably includes functionality to cause the participant's workstation to display the portion of the private work area 340 containing those images.

Figure 2:
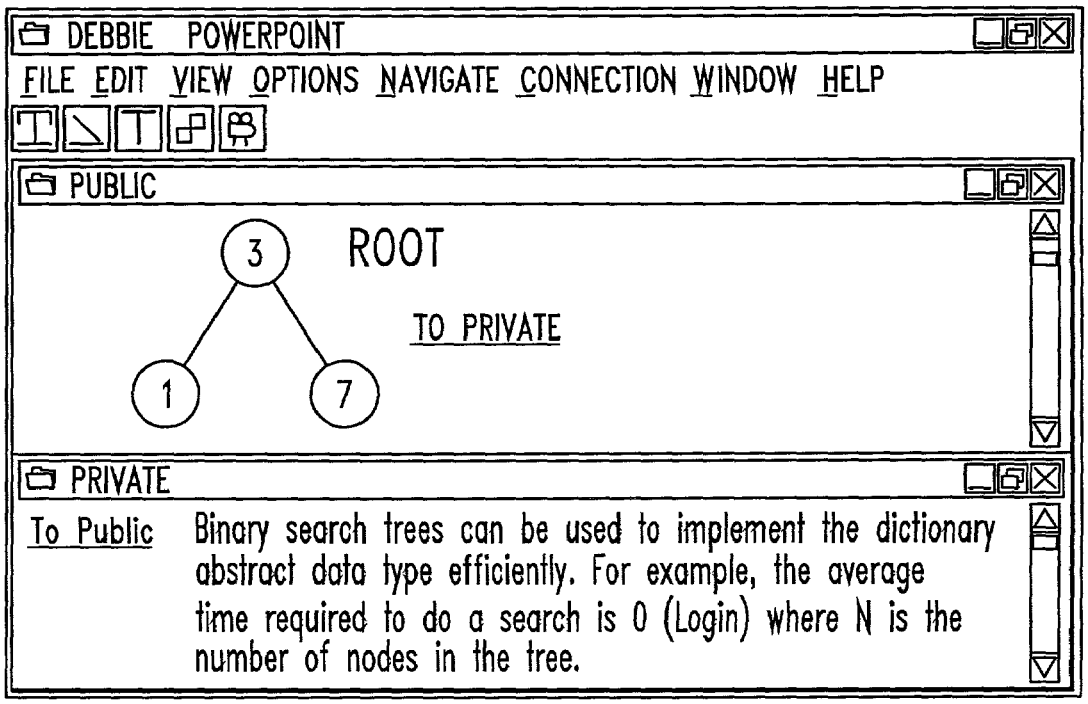
FIG. 2 is an example of the image of FIG. 1, superimposed with images placed on a participant public work area, including a footnote image having a corresponding text image on the participant's private work area.
Figure 5:
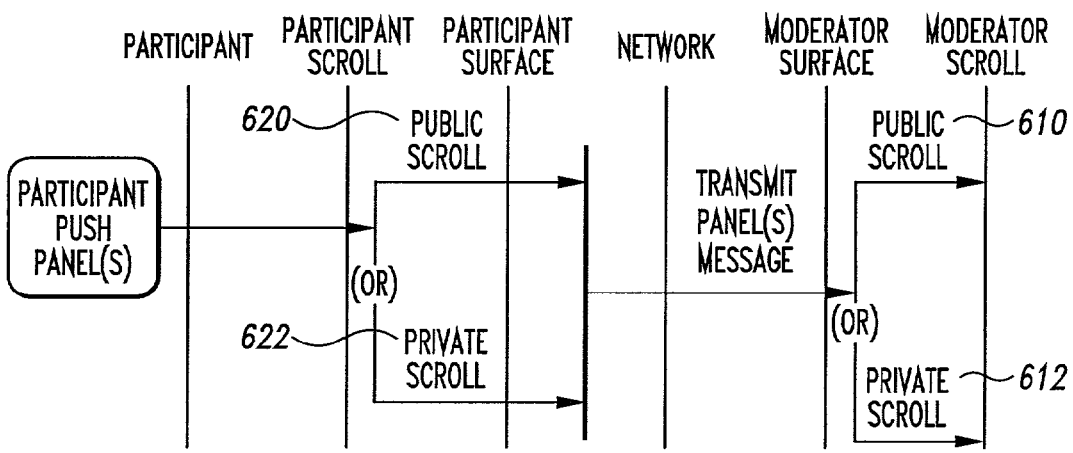

Thus, the presently preferred embodiment group work area 300 could be used to aid in teaching the participants, for example, about binary search trees. The moderator might select a place on the shared work area 330, and draw an image of a binary search tree, as shown in FIG. 5, thereby placing the image shown in FIG. 1 on the shared work area 330, and causing it to be displayed on each of the participant workstations. The moderator might state orally that the part of the tree containing the circled "3" is called the root, as a part of a lengthier oral description of the properties of binary search trees generally. A participant might place an annotation saying "root" in his or her participant public work area 345, to identify that portion of the binary search tree. The participant might also type a lengthier annotation on their private work area 340, with footnote symbols saying "To Private" and "To Public" and comprising hypertext links such that "clicking" on one of them (either with the drawing pad, a mouse, or some other appropriate input device) in one window causes the other window to center on the other footnote symbol. FIG. 2 illustrates what this might look like on the display device of the participant's workstation. Those skilled in the art of computer operation will recognize the "scroll bars" that provide graphical information indicating how to scroll these scrolls up and down. Note that either window could be independently scrolled to review images above or below the ones shown here.

In the presently preferred embodiment, each of the workstations is a complete and independent computer workstation sharing a network connection to each of the other workstations. Thus, in the presently preferred embodiment, each workstation includes its own processor, monitor, storage media, memory, etc. In the presently preferred embodiment, the workstations transfer information via a dynamic TCP/IP protocol, so that no shared storage is needed. Those skilled in the art will appreciate that the system need not use TCP/IP, and that any suitable protocol may be used to transmit information from workstation to workstation. In certain alternative embodiments, in order to reduce the cost of the workstations, some or all of them may include fewer than all of these features. For example, in certain embodiments, the participant workstations include a processor and monitor, but no memory or storage media. These assets are preferably located elsewhere in the network, such that the workstations can use them.

Figure 6:
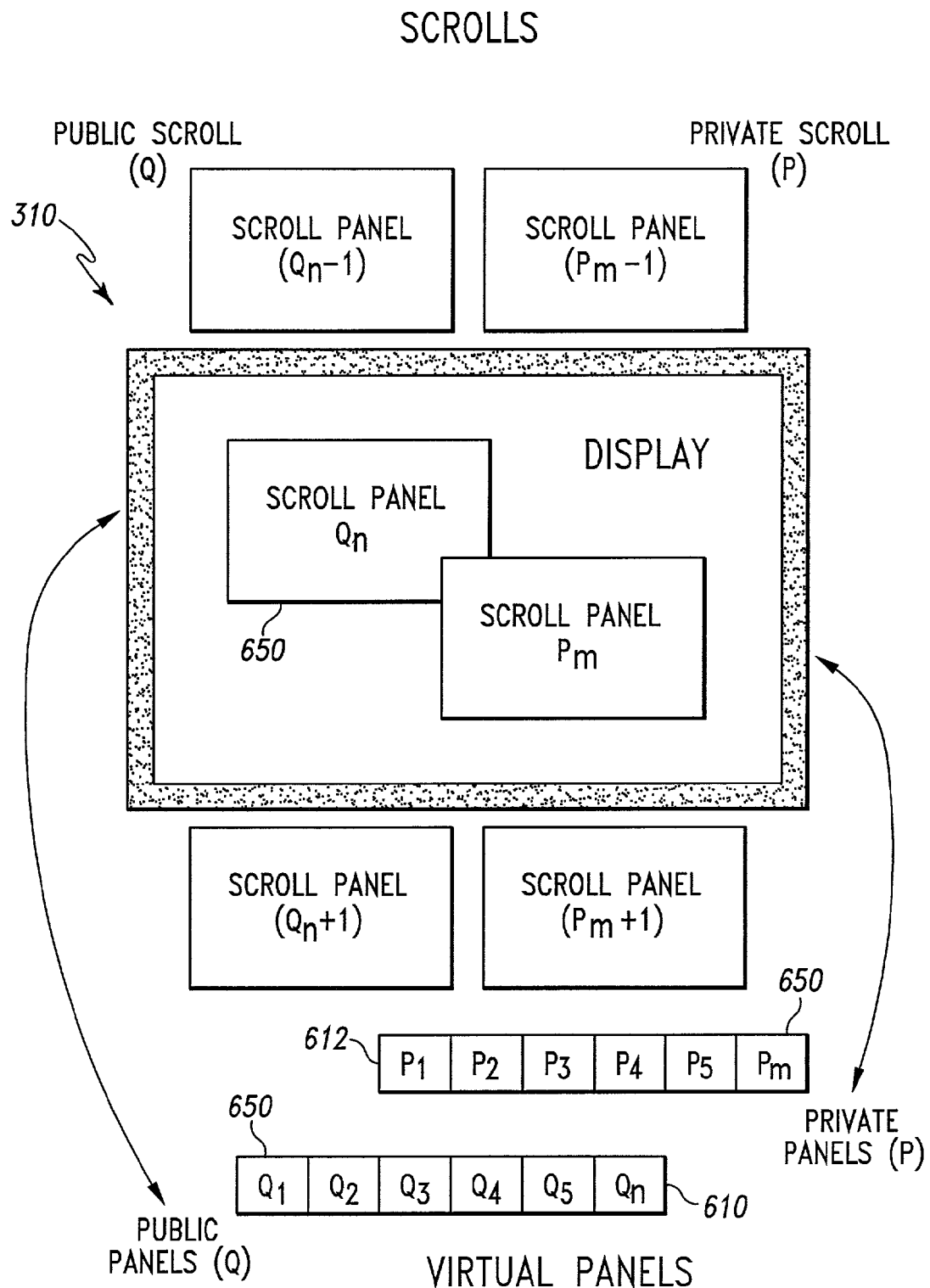
FIG. 6 is a diagram of certain elements of a preferred embodiment user work area according to the present invention.

Preferably, the moderator work area 310 and each of the participant work areas 320 are each implemented as at least one scroll, each scroll comprising a set of practically infinitely scrollable panels. In the presently preferred embodiment, for example, the moderator work area 310 comprises a moderator public scroll 610 and a moderator private scroll 612, each having one or more panels 650 as shown in FIG. 6. Likewise, each participant work area 320 comprises a participant public scroll 620 and a participant private scroll 622, described herein with reference to FIG. 5, each scroll having a number of panels. (In those embodiments lacking a moderator private work area 340a, the moderator private scroll 612 is excluded.) Preferably, each of the scrolls is made up of one or more panels 650 in series, similar to a slide-show. However, unlike a slide show, preferably, portions of more than one panel 650 can be displayed at a time, so that an image can be placed straddling two panels 650 and still have each portion displayed simultaneously. "Scrollable," in this context, means that the panels 650 can be larger than what can be displayed on the display device, but that the portion that is being displayed can be "scrolled" by means of a scroll bar or other appropriate mechanism, such as would occur to a person of ordinary skill in the art of computer use. "Practically infinite," in this context, means limited by the ability of volatile memory to contain the entire scroll. In certain embodiments, the panels 650 can scroll vertically or horizontally. In certain embodiments, the panels can scroll both vertically and horizontally. In certain alternative embodiments, the panel's length is limited by persistent memory, such that portions of the panel are swapped between volatile and persistent memory as necessary when the size of the panel exceeds what can be stored in volatile memory alone. Preferably, the panels have a variable size. Thus, in order to conserve space, a panel preferably is created with some relatively small size. If additional space is needed in order to accommodate larger images, the panel's size can be increased. Thus, in the preferred embodiment, the user defines the actual size of each panel. Preferably, such additional panel size can be added even after additional panels have been added to the scroll.

In the presently preferred embodiment, each panel 650 comprises a linked-list of objects that have been added to it. Each workstation can "play back" the evolution of the panel by adding these objects, one at a time, to the display, in the order they were originally added. It will be appreciated that this means that each object generally occupies only a single panel 650. Thus, while an image can straddle two panels 650, it will generally be comprised of objects that do not. It will also be appreciated that other data structures can also be used to store information corresponding to images in panels 650. For example, the workstations need not use an object-oriented database structure. Panels 650 could be stored in a relational database. For another example, the workstations need not even store the objects in an internal data structure. In the presently preferred embodiment, the footnote objects comprise hyperlinks that cause the corresponding annotations to be displayed when activated, for example by clicking on them with a mouse.

In the presently preferred embodiment, the moderator adds an image to the shared work area 330 by adding an object corresponding to it to the moderator public scroll 610. Information is then sent to each participant workstation causing that object to be added to each of the participant's public scrolls 620. The moderator places images on the moderator private work area 340*a* by adding an object corresponding to it to the moderator private scroll 612. Likewise, a participant adds images to the participant's public work area 345 or the participant's private work area 340 by adding an object corresponding to it to the participant's public scroll 620 or the participant's private scroll 622, respectively. Thus, in the preferred embodiment, images on the participant's public work area 345 are "stacked" in chronological order, without regard to who placed them there.

In the presently preferred embodiment, the moderator workstation includes an electronic whiteboard upon which the moderator can draw directly, for example, using a finger, to generate objects that are placed on the moderator's public scroll 610 or private scroll 622. In those embodiments in which at least some of the participant workstations are proximally located, the whiteboard can be oriented to permit participants to observe while images are drawn on it. In this way, participants can receive information from non-verbal cues, such as gestures the moderator makes in relation to the images on the whiteboard. Preferably, the whiteboard can also be oriented so that the participants cannot see it, so that the moderator can prepare a complete image that can be presented to the participants as a finished product. In certain embodiments, the participant workstations are located remotely, so that participants could not see a whiteboard. In such embodiments, the whiteboard can be omitted.

In the presently preferred embodiment, the participant workstations include a pen-based video tablet, which permits the participants to place objects on the participant's public scroll 620 or private scroll 622. Preferably, the moderator workstation also includes a pen-based video tablet. Preferably, each workstation also includes a keyboard for entering text objects. Other input devices, such as mice, optical scanners, etc., can also be advantageously included at one or more of the workstations. In those embodiments in which the moderator work area 310 includes a moderator private scroll 612, the moderator workstation advantageously includes at least two monitors—one for displaying the private work area 340*a,* and one for displaying the shared work area 330.

The combination of a display device and a drawing input device (such as a whiteboard or pen-based video tablet) is sometimes referred to as a drawing surface. The user can create an image on the group work area 300 by drawing on the input device, which then creates a data structure defining the image. The data structure is placed on the appropriate scroll, and the image is displayed on the display device. Of course, other types of images, including graphic images stored in a graphics file, can be placed on the group work area 300, displayed on the display devices, and combined with drawn images. Thus, for example, a digital photograph could be displayed, and some relevant feature highlighted by drawing a circle or an arrow on the drawing surface.

Figure 4:
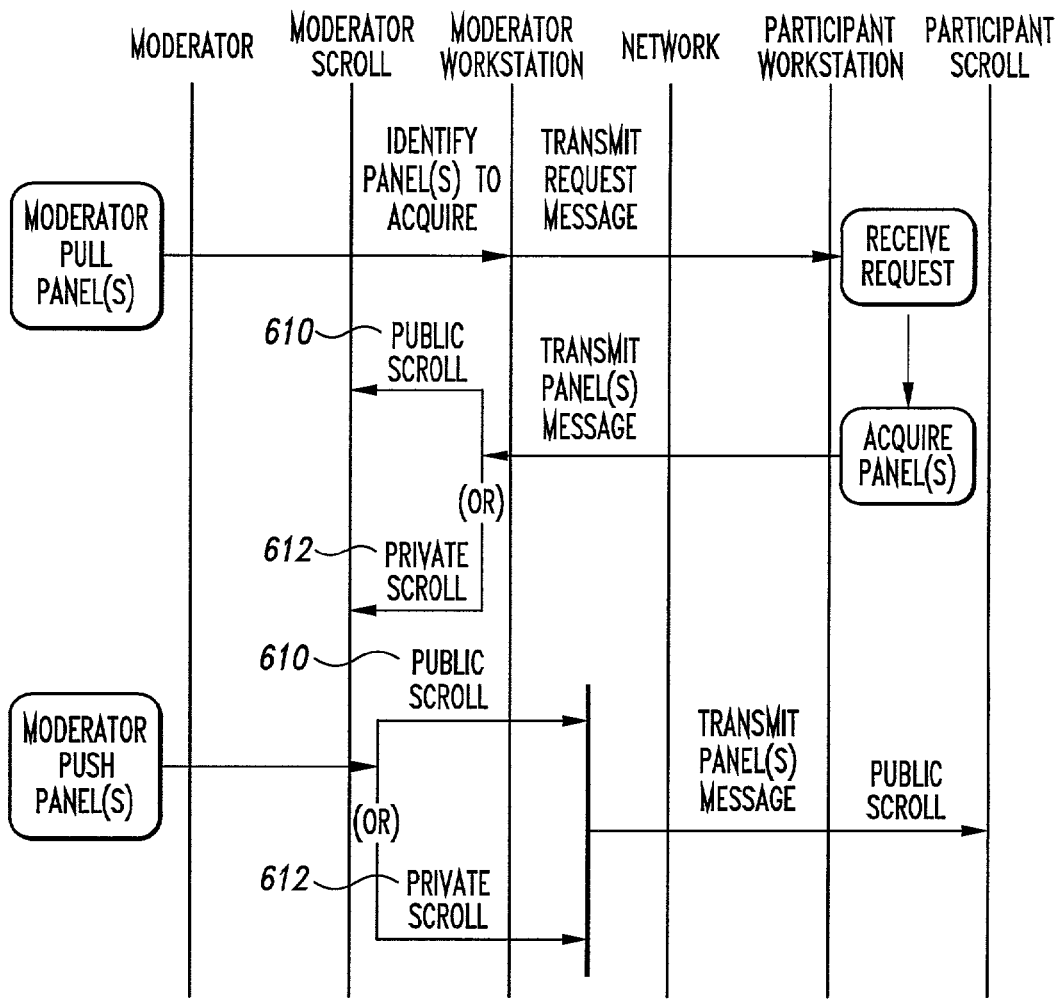
FIGS. 4 and 5 are diagrams showing certain dynamic sharing methods of a group work area according to the present invention.

In certain embodiments a system according to the present invention can use dynamic or static sharing methods to transfer information between workstations. As discussed above, in certain embodiments the system uses TCP/IP to permit dynamic sharing methods. FIGS. 4 and 5 illustrate three such dynamic sharing methods. For example, as shown in FIG. 4, the moderator can select a panel from either the moderator's public scroll 610 or the moderator's private scroll 612 to be sent or "pushed" to a participant's workstation. For another example, as shown in FIG. 4, a moderator might pull a panel from a participant's public scroll 620 or private scroll 622 by selecting the panel to pull. A message is sent to the participant's workstation, which then sends the panel back to the moderator workstation without participant interaction. The returned panel can be placed on the moderator's public scroll 610 or the moderator's private scroll 612, at the moderator's discretion.

FIG. 5 illustrates a kind of dynamic sharing in which the participant pushes a panel either from the participant's public scroll 620 or private scroll 622, which is then placed on the moderator's public scroll 610 or private scroll 612, at the moderator's discretion.

Using these methods, a moderator might place a question on a panel 650 of the moderator's public scroll 610, and request that a participant pass a panel 650 with the answer from their private scroll 620 to the moderator workstation. Alternatively, the moderator might actively select a participant's answered panel 650 and pull the panel 650 without participant interaction. Or, the moderator could pose a question on the moderator's public scroll 610, and then "collect" the answers. The answers could be collected by copying the panels 650 directly to the moderator's public scroll 610, or by copying the panels 650 to the moderator's private scroll 612, where they can be reviewed before pasting selected answers into the moderator's public scroll 610 and sharing them with the group.

A preferred embodiment system according to the present invention can also use static sharing methods. For example, one or more scroll panels 650 can be exported and written to a panel file. A user can export panels 650 from either their public scroll 610 or 620, or their private scroll 340, to a panel file. The resulting electronic files can be copied, deleted, or imported into another session. When imported into another session, the panel file can be placed by a participant on their private scroll 622 or their public scroll 620, or by the moderator either on the moderators public scroll 610 (and, consequently, each participant's public scroll 620) or the moderators private scroll 612. Panel files can also be transferred to other users, for use in the same or other sessions.

Thus, a user can save information, in the form of files, corresponding to images on their work area 310 or 320. The resulting information can be imported in another session. A participant can place these images on their public work area 345 or their private work area 340, while the moderator can place these images on the shared work area 330 or the moderator private work area 340a.

In the presently preferred embodiment, entire sessions, or portions of sessions, can be saved in a notebook file. This permits a session to be interrupted, and later resumed. The scrolls of a single user's work area form a chapter in the notebook file. Thus, for example, a participant could save only the their own work area to a notebook file having only a single chapter. Or, for example, the moderator could save the entire group work area 300 in a notebook file having one chapter for each user that was involved in the session. Notebook files can be opened, closed, copied, or deleted. Two notebook files can be merged into a single notebook file. Notebook files can be transferred between users. The electronic size of a notebook is typically limited only by storage space on persistent memory media.

Figure 7:
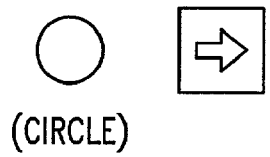
FIG. 7 is an illustration of the evolution of an image created by adding image objects to a panel of the preferred embodiment.
Figure 7:
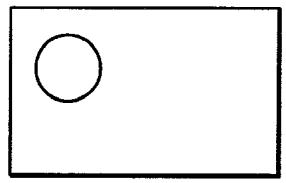
Figure 7:
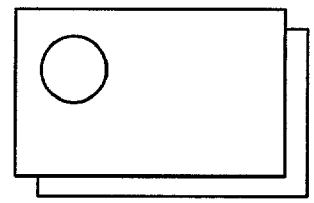
Figure 7:
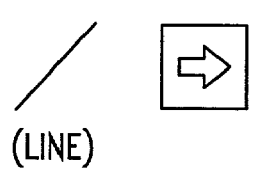
Figure 7:
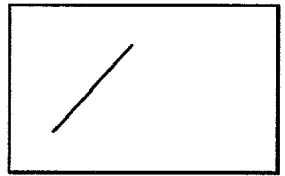
Figure 7:
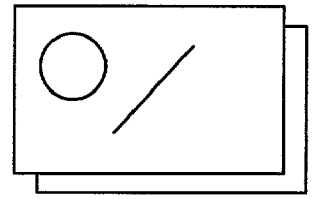
Figure 7:
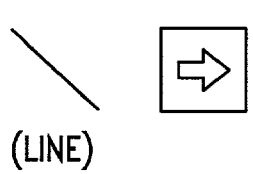
Figure 7:
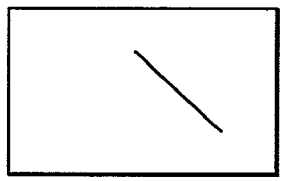
Figure 7:
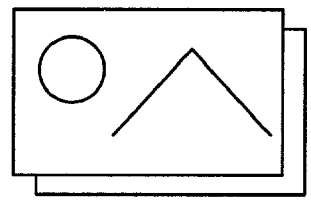
Figure 7:
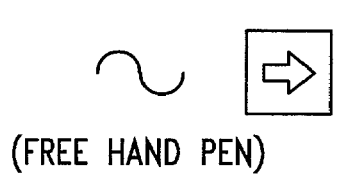
Figure 7:
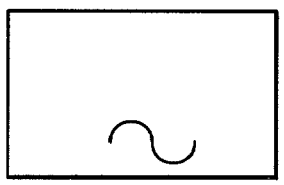
Figure 7:
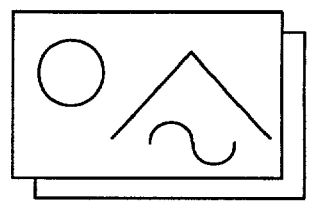
Figure 7:
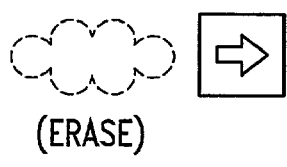
Figure 7:
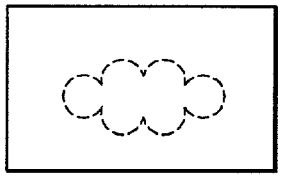
Figure 7:
Figure 7:
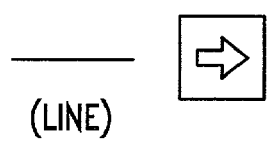
Figure 7:
Figure 7:
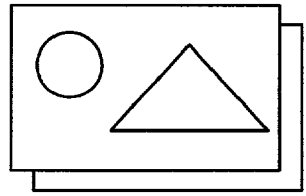
Figure 7:
Figure 7:
Figure 7:
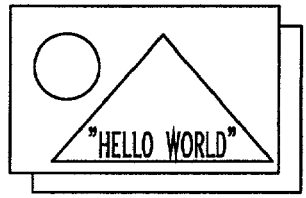

Preferably, each step in the evolution of the group work area 300 is stored in the notebook file, so that the users can review the group discussion by watching as each new image is added, or as an existing image is altered. FIG. 7 illustrates the evolution of a complex image on a surface, as it is constructed from a set of simpler images. The simplest images that can be placed on the group work area 300 are called objects. In the presently preferred embodiment, the available objects include free-form draw objects, defined shapes (such as lines, circles, rectangles, arrows, polygons, ellipses, perpendicular lines, answer boxes, etc.), typed text, and erasures. In the presently preferred embodiment, "erasure" objects actually just fill a region with the background color, so that images or portions of images are masked. They do not remove previously added objects from the data structure of the panels 650, or the group work area 300.

In the presently preferred embodiment, objects on the moderator's public scroll 610 are conveyed to participants' workstation in a dynamic fashion. The moderator's objects are typically conveyed only when the objects are complete. So, for example, while the moderator is creating a draw object, the participants do not see the progress of developing the draw object on their display. After a pointer creates the draw object and the pointer is no longer focused on the object, the object is then conveyed to all participants, and added to their public scroll 620.

The presently preferred embodiment employs the structure of panels 650 as a linked-list to capture and replay the creation of objects for both moderator and participants. The system captures information to a scroll panel 650 in a sequence of individual objects as they are applied to the scroll panel 650. The objects are part of the panel 650 and are not stored as separate files. The creation sequence of objects on a scroll panel 650 may be replayed to show the sequence in an object-by-object fashion. There is no "capture" activation required by a user since the placement of objects on the panel 650 is a native function. Thus, in the preferred embodiment, there is no need for the moderator or a participant to recognize in advance that the evolution of an image may be useful, in order to activate a capture function (i.e. a "record" function). Since the objects are embedded in a panel 650 the replay feature is natively available when panel files 650, panel messages, or notebook files are communicated.

Thus, it will be appreciated that in addition to storing images corresponding to information discussed by the group on the series of panels 650 of the group work area 300 in a pattern indicative of the order in which it was discussed, such as, for example, placing them from top to bottom on the work area as they are created (or from left to right on a horizontally scrolling surface), sets of related images can also be stored on the work surface within a single panel 650, as a series of modifications to a previous image. In this way, the notebook file can store evolution in an image that took place during the session.

For example, in a discussion about architecture, the moderator might start by showing a basic floor plan that will serve as a starting point for a number of points during the discussion. In addition to simply drawing that basic floor plan during the discussion, it might have been drawn by the moderator before the group discussion (for example, by using the system in standalone mode), or it might have been imported as a digital image (such as from a peg file)—for example by being downloaded from the internet—or it might have been optically scanned in by the moderator. During the discussion, the moderator could alter the floor plan in order to show the solution to some design problem. If this solution introduced some new design problem, the moderator might then alter this new floor plan. In this way, the floor plan might go through several iterations. Rather than placing a new image on a new location on the shared work surface 300, these images could be stored as alterations in the previous image. Thus, when a user later reviewed the discussion, the basic floor plan could be shown first, and then be again replaced by each iteration of that basic design that was included by the moderator during the discussion. Note that in the preferred embodiment, the later review can be done during the ongoing session, as discussed further herein, with respect to session synchronization.

In the preferred embodiment, in which the moderator work area 310 and participant work areas 320 are implemented as a public scroll and a private scroll, these alterations are stored as additional objects in series on the panel 650, including, for example, erase objects and new draw objects.

Another example of how a set of related images might be advantageously placed in the same apparent location of the group work area 300 is animation. For example, in a discussion of a rotary combustion engine, a series of images illustrating the movement of the parts, shown in a continuous closed loop, could be included, as a means of graphically illustrating the engine cycle. Such animations could be stored as a looped series of objects, such as bit maps. In certain embodiments, such animations could be stored as an animation object.

The presently preferred embodiment includes means to synchronize a workstation with an ongoing session. For example, a participant may be late for the start of the discussion, or may be interrupted during a session. The presently preferred embodiment includes two methods for synchronization: session synchronization and scroll panel synchronization.

In the preferred embodiment, session synchronization transmits all moderator objects from the beginning of the session up to the most recent object entered by the moderator to the moderator public scroll 610. In situations where a participant was late joining a session, session synchronization allows the participant to obtain all panels from the beginning of the session. It then positions the participant's public scroll to same location as the moderator's scroll panel.

Scroll panel synchronization allows participants that start a session with the moderator to catch up while in a session. This feature is enabled by a continuous and automatic synchronization process that occurs without moderator or participant intervention. This frees the participant to not track their public scroll 620 to the moderator's public scroll 610—that is, when the participant can display a previous panel 650 or replay the link-list comprising the present panel 650. For example, the participant can also review a prior panel 650 to add local annotations which might not have occurred to them before. During this time the moderator may continue to present new panels 650 during the session. Scroll panel synchronization repositions the participant's public scroll 620 so it is at the same location as the moderator's public scroll 610. It also ensures that all panels from the moderator's public scroll 610 are available to the participant during the period the participant's public scroll 620 was not synchronized with the moderator's public scroll 610.

In the presently preferred embodiment, the moderator workstation includes functionality for an assessment mode. Certain alternative embodiment systems include this functionality elsewhere in the system. Regardless of where the assessment mode functionality is implemented, panel files 650 can include checkpoint objects. Checkpoint objects need not have any graphic representation, though in certain embodiments they do. The checkpoint object serves as a flag in the linked-list of a panel file 650. When placed in assessment mode, replay of a panel 650 either begins or ends with the selected checkpoint.

For example, in certain embodiments, checkpoint objects can be used by the moderator to mark the end of a time limit during the discussion. For example, if a teacher wished to use the assessment mode to present and review a question to the participating students, the question might be created on a panel with 25 objects (free hand draw objects, typed text objects, shapes, etc.). A participant might begin to write an answer composed of 50 objects or so. During the process of preparing this answer, the participant might realize that their approach to the answer is incorrect, and select an erase object to cover over part of their answer. The participant then could continue to add objects to complete the answer. At some point, the teacher will want to explain the correct answer. The moderator can use the assessment mode to place a checkpoint object on each participant's public scroll 620 (by placing it on the moderator's public scroll 610), and then begin to explain the correct answer. At this point, if a participant realizes their answer is again mistaken, they can again erase (i.e. cover over) the errors and add images demonstrating the correct answer. The participant can view the corrected answer normally. However, when the teacher pulls the panel 650 and replays it to review the student's performance, the replay will stop at the checkpoint, so that the teacher knows that subsequent objects were added after the teacher began to explain the correct answer.

Note that the teacher need not pull the relevant panel 650 to review an answer. For example, the teacher could open a student's notebook file in standalone mode instead.

In certain embodiments, another type of checkpoint object can be inserted by the participant, in order to mark where the teacher should begin reviewing. For example, in the example above, the student could insert such a checkpoint object after the first erase object. When the teacher pulls and reviews that panel in assessment mode, the display would begin at that point, already displaying each of the previous objects (including the erase object), and begin adding the subsequent objects to the display one at a time. In this way, the teacher need not spend time reviewing work which the student has already recognized was in error. Note that the teacher may preferably still review the earlier work, either by overriding the student's checkpoint, or by reviewing the panel outside of assessment mode.

In the presently preferred embodiment, the moderator workstation can only pull images from a participant's public scroll 620 or private scroll 622 if the participant decides to permit it. This decision may be implemented by means of a software flag, for example. This assures the participants that they can make annotations privately. It is believed that this guarantee of privacy places the participants more at ease, and therefore more able to experiment or brainstorm. Certain alternative embodiments lack this feature. Certain other alternative embodiments can implement sessions either including or excluding this feature, at the option of the moderator. In these last embodiments, preferably some visual cue, such as an icon or a background color, is included in the participant's displays, so that they can readily identify whether the session permits such private annotations.

In certain embodiments, the moderator workstations and participant workstations are determined completely by software functionality. In these embodiments, more than one of the user's workstation can become the moderator workstation. For example, the moderator workstation could be selected by passing a security token from the moderator workstation to a participant workstation, thereby causing their roles to reverse. These embodiments could advantageously be used to facilitate the transfer of information between members of a group in environments where the transfer is not necessarily expected to flow primarily from one user to the others. For example, such embodiments could advantageously be used to facilitate information transfer in a remote conference of employees of one or more businesses. Note that it is not necessary in these embodiments for every workstation to have the same devices. For example, one workstation could be a preferred moderator workstation, having a plurality of display devices (for example, one for displaying the shared work area 330 and one for displaying the moderator private work area 340a), while the other workstations could be preferred participant workstations, having only a single display device each. Despite this limitation, the group work area could advantageously permit any of the participant work stations to become the moderator work station. Such embodiments could advantageously be used, for example, in classroom settings, where the transfer of information is generally expected to predominantly flow from a designated moderator (the teacher), in order to facilitate situations in which a participant turns out to have a significant amount of information to convey to the other users. For example, in a class focused on architecture, the teacher might be especially interested in the perceptions of a foreign student about some aspect of foreign or domestic architecture. In that situation, the moderator could advantageously make the participant's workstation the moderator's workstation, so that the foreign student can augment his or her comments with images that are placed directing on each of the other user's public work areas.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for knowledge transfer in a group setting, the system comprising:
    a plurality of participant workstations, each adapted to provide a participant work area having a plurality of panels, each participant workstation having at least one corresponding participant input-device and participant display, and each of the participant input-devices being adapted to define participant images that are then included on the corresponding participant work area; and
    a moderator workstation comprising at least one moderator input-device and adapted to provide a moderator work area having a plurality of panels, the at least one moderator input-device being adapted to define moderator images that are then included on the moderator work area and to select moderator images that are then simultaneously included on each of the participant work areas;
    wherein the moderator input-device is further adapted to select participant images from any of the plurality of participant work areas that are then included on the moderator work area;
    wherein the moderator workstation is adapted to identify a panel not currently displayed in a selected participant work area and to transmit a request message to the corresponding participant workstation for the identified panel; and
    wherein the corresponding participant workstation is adapted to transmit the identified panel to the moderator workstation in response to the request message.

2. The system of claim 1,
    wherein the moderator workstation is adapted to identify more than one panel to acquire from a selected participant work area and to transmit a request message to the corresponding participant workstation for the identified panels; and
    wherein the corresponding participant workstation is adapted to transmit the identified panels to the moderator workstation in response to the request message.

3. The system of claim 1, further comprising a plurality of display elements adapted to display the moderator work area and the plurality of participant work areas.

4. The system of claim 3, wherein the plurality of display elements are substantially located to permit a user to simultaneously view one of the display elements and hear substantially every other user that is viewing another of the display elements.

5. The system of claim 4, wherein the user hears substantially every other user through a form of audio transmission.

6. The system of claim 3, wherein the work areas are permitted to have a size exceeding that which can be displayed on the display elements.

7. The system of claim 6, wherein the work areas each comprise at least one scroll.

8. The system of claim 7, wherein each scroll comprises a set of scrollable panels.

9. The system of claim 1, wherein the work areas can be stored as a single computer file, and wherein previously-saved files can be imported into a work area.

10. The system of claim 1, wherein the input-devices are adapted to define the images by creating text objects and draw objects corresponding to the images.

11. The system of claim 10, wherein the input-devices are further adapted to define the images by creating erase objects.

12. The system of claim 10, wherein the input-devices are further adapted to define the images by creating bitmap objects.

13. The system of claim 1, wherein additional participant work areas can be created and added to the system while the system is in operation.

14. The system of claim 1, further comprising collision-correction functionality.

15. The system of claim 14, wherein the collision-correction functionality comprises functionality permitting toggling between a plurality of view modes.

16. The system of claim 14, wherein the collision-correction functionality comprises functionality permitting relocation of images on the participant work area.

17. A network of computers programmed for knowledge transfer in a group setting, the network comprising:
    a plurality of participant workstations, each programmed to provide a participant work area and having at least one corresponding participant input-device, and each of the participant input-devices being adapted to create data structures defining participant images that are then included in the participant work area; and
    a moderator workstation programmed to provide a moderator work area and comprising at least one moderator input-device, the at least one moderator input-device being adapted to:
        create data structures defining moderator images that are then included in the moderator work area, and
        to select moderator images that are then simultaneously included in each of plurality of participant work areas;
    wherein the moderator input-device is further adapted to select participant images from any of the plurality of participant work areas that are then included in the moderator work area;
    further comprising collision-correction functionality permitting relocation of images in the participant work area;
    wherein the relocation of images occurs automatically when a collision occurs.

18. A system for knowledge transfer in a group setting, the system comprising:
    a plurality of participant workstations each adapted to provide a participant work area and having at least one corresponding participant input-device and participant display, each of the participant input-devices being adapted to define participant images that are then included in the corresponding participant work area;
    a moderator workstation comprising a moderator input-device and moderator display, said moderator workstation adapted to provide a moderator work area including a shared work area where images may be placed by the moderator and participants, the moderator input-device being adapted to define moderator images that are then included in the shared work area and in each of the participant work areas, the moderator images generally displayed superimposed on participant images in the participant work area; and collision-avoidance functionality permitting a participant to place a first image in the shared work area visible to the moderator, the first image having a corresponding image in the participant work area that is not visible to the moderator.

19. The system of claim 18, wherein the moderator work area comprises the shared work area and a moderator private work area, and each participant work area comprises a participant public work area and a private work area.

20. The system of claim 19, wherein each participant's work station displays images placed on the shared work area superimposed on images placed in that participant's public work area.

21. The system of claim 18, wherein the system can be used in a group mode and a standalone mode.

22. The system of claim 18, wherein the workstations are located such that a first user positioned to use a workstation and a second user positioned to use a different workstation can hear each other speak.

23. The system of claim 22, wherein every user positioned to use a workstation can hear every other user positioned to use any other workstation.

24. The system of claim 18, wherein no user positioned to use a workstation can hear any other user positioned to use a different workstation.

25. The system of claim 18, wherein images are organized in notebook data structures comprising at least one panel.

26. The system of claim 25, wherein the images are stored as at least one object in a single panel.

27. The system of claim 25, wherein the images are stored as at least one record in a relational database.

28. The system of claim 25, wherein the images are stored as at least one record in an indexed database.

29. The system of claim 18, wherein images placed on a participant's work area at a participant workstation may be viewed only at that workstation unless that participant decides to permit them to be viewed from another workstation.

30. The system of claim 29, wherein a participant can implement a decision to permit an image placed on a participant work area to be viewed at another workstation by setting a flag.

31. The system of claim 29, wherein a participant can implement a decision to permit an image placed on a participant work area to be viewed at another workstation by actively causing information corresponding to the image to be transmitted to another workstation.

32. The system of claim 18, wherein the collision-avoidance functionality comprises a margin that does not have a corresponding location of the shared work area.

33. A network of computers programmed for knowledge transfer in a group setting, the network comprising:

a plurality of participant workstations, each programmed to provide a participant work area and having at least one corresponding participant input-device, and each of the participant input-devices being adapted to create data structures defining participant images that are then included in the participant work area; and a moderator workstation, programmed to provide a moderator work area and comprising at least one moderator input-device, the moderator work area including a shared work area, the at least one moderator input-device being adapted to:

create data structures defining moderator images that are then included in the moderator work area, and to select moderator images that are then simultaneously included on each of plurality of participant work areas;

wherein the moderator input-device is further adapted to select participant images from any of the plurality of participant work areas that are then included on the moderator work area;

further comprising collision-avoidance functionality that permits the participant to place footnote images on the participant work area that provide a link between the footnote images and corresponding images placed on a portion of the participant work area that is not superimposed on the shared work area.

34. A network of computers programmed for knowledge transfer in a group setting, the network comprising:

a plurality of participant workstations, each programmed to provide a participant work area and having at least one corresponding participant input-device, and each of the participant input-devices being adapted to create data structures defining participant images that are then included in the participant work area; and a moderator workstation, programmed to provide a moderator work area and comprising at least one moderator input-device, the at least one moderator input-device being adapted to:

create data structures defining moderator images that are then included in the moderator work area, and to select moderator images that are then simultaneously included on each of plurality of participant work areas;

wherein the moderator input-device is further adapted to select participant images from any of the plurality of participant work areas that are then included on the moderator work area;

further comprising collision-avoidance functionality that permits the participant to place footnote images in the participant work area, the footnote images providing a link to corresponding images located elsewhere.

35. The network of claim 34, wherein the participant work area comprises a participant public work area and a private work area, wherein the moderator work area includes a shared work area, and wherein images placed on the participant's public work area are generally displayed superimposed on images on the shared work area.

36. The network of claim 35, wherein the corresponding images are placed on the participant's private work area.

37. The network of claim 34, wherein the footnote images are implemented as hyperlinks which include functionality that causes the participant's workstation to display the corresponding images.

38. A network of computers programmed for knowledge transfer in a group setting, the network comprising:

a plurality of participant workstations, each programmed to provide a participant work area and having at least one corresponding participant input-device, and each of the participant input-devices being adapted to create data structures defining participant images that are then included on the participant work area;

a moderator workstation, programmed to provide a moderator work area and comprising at least one moderator input-device, the at least one moderator input-device being adapted to:

create data structures defining moderator images that are then included on the moderator work area, and select moderator images that are then simultaneously included on each of plurality of participant work areas;

wherein the moderator work area comprises a moderator public scroll and a moderator private scroll, and each participant work area comprises a participant public scroll and a participant private scroll;

wherein each participant workstation displays images placed on the participant's public scroll by the moderator superimposed on images placed on the participant's public scroll by the participant, and wherein the moderator input-device is further adapted to select participant images from any of the plurality of participant work areas that are then included on the moderator work area;

further comprising collision-avoidance functionality that permits the participant to place footnote images on the participant work area that provide a link between the footnote images and corresponding images that are not typically superimposed on a shared work area.

39. A network of computers programmed for knowledge transfer in a group setting, the network comprising:
    a plurality of participant workstations, each programmed to provide a participant work area and having at least one corresponding participant input-device, and each of the participant input-devices being adapted to create data structures defining participant images that are then included on the participant work area; and
    a moderator workstation, programmed to provide a moderator work area and comprising at least one moderator input-device, the at least one moderator input-device being adapted to:
        create data structures defining moderator images that are then included on the moderator work area, and
        select moderator images that are then simultaneously included on each of plurality of participant work areas;
    wherein the moderator work area comprises a moderator public-scroll and a moderator private scroll, and each participant work area comprises a participant public scroll and a participant private scroll;
    wherein each participant workstation displays images placed on the participant's public scroll by the moderator superimposed on images placed on the participant's public scroll by the participant;
    wherein the moderator input-device is further adapted to select participant images from any of the plurality of participant work areas that are then included on the moderator work area;
    wherein the participant work area comprises a participant public work area and a participant private work area; and
    wherein images placed on the participant public work area are generally displayed superimposed over images on the public scroll;
    further comprising collision-avoidance functionality that permits the participant to place footnote images in the participant public work area, the footnote images providing a link to corresponding images located in the participant's private work area.

40. The network of claim 39, wherein the footnote images are implemented as hyperlinks which include functionality that causes the participant's work station to display the corresponding images.

41. A system for knowledge transfer in a group setting, the system comprising:
    a plurality of participant work stations, each comprising:
        at least one participant display device;
        at least one input device;
        a participant public scroll; and
        a participant private scroll;
    the at least one participant input device being adapted to permit the participant to create data structures on the participant public scroll and participant private scroll defining images that are displayed on the at least one participant display device; and
    a moderator work station, comprising:
        at least one moderator display device;
        at least one moderator input-device; and
        a moderator public scroll;
    the at least one moderator input device being adapted to create data structures on the moderator public scroll and each of the participant public scrolls defining images that are displayed on the at least one moderator display device and on each of the at least one participant display devices;
    wherein the scrolls each comprise a plurality of panels, each panel comprising a plurality of objects created in a sequence; and
    wherein at least one of said workstations is adapted to replay the creation sequence of objects on a given panel in object-by-object fashion.

42. The system of claim 41, wherein the objects are organized as linked-lists on each panel.

43. The system of claim 42, wherein objects placed on a scroll can be replayed by displaying corresponding images as the objects are added to the display one object at a time.

44. The system of claim 43, wherein the objects are added to the display in the order they were added to the scroll.

45. The system of claim 43, wherein the objects are added to the display in the order they were added to a given panel.

46. The system of claim 43, wherein data structures included on the moderator public scroll are automatically placed on each of the participant public scrolls, and wherein a moderator input device can be used to permit a data structure created by a participant input device to be placed on other participant's scrolls by selecting it to be included on the moderator public scroll.

47. The system of claim 43, wherein a moderator input device can be used to permit a data structure created by a participant input device to be included on other participant public scrolls by causing the participant work station at which that participant input device is located to become the moderator workstation.

48. The system of claim 47, wherein a moderator input device can cause a participant workstation to become the moderator input device by passing a security token.

49. The system of claim 41, wherein each of the participant input devices can only create data structures that are placed on the participant's scrolls unless a moderator input device is used to permit otherwise.

50. A system for knowledge transfer in a group setting, the system comprising:
    a plurality of participant workstations, each adapted to provide a participant work area and having at least one corresponding participant input-device and participant display, each of the participant input-devices being adapted to define participant images that are then included in the corresponding participant work area; and
    a moderator workstation comprising a moderator input-device and moderator display and adapted to provide a moderator work area, the moderator input-device being adapted to define moderator images that are then included in the moderator work area and to transmit moderator images to participant workstations, said moderator images including objects drawn by the moderator using the moderator input-device, wherein the moderator workstation is further adapted to transmit an object drawn by the moderator to participant workstations when the object is complete.

51. An interactive learning method, comprising:
providing a participant work area on each of a plurality of participant workstations each having at least one corresponding participant input-device and participant display, each of the participant input-devices being adapted to define participant images that are then included in the corresponding participant work area;
providing a moderator work area on a moderator workstation comprising a moderator input-device and moderator display, the moderator input-device being adapted to define moderator images that are then included in the moderator work area and to transmit moderator images to participant workstations, said moderator images including objects drawn in the moderator work area using the moderator input-device; and
transmitting an object drawn in the moderator work area to participant workstations when the object is complete.

52. An interactive learning method, comprising:
providing on each of a plurality of participant workstations a participant work area having a plurality of panels, each participant workstation having at least one corresponding participant input-device and participant display, each of the participant input-devices being adapted to define participant images that are then included in the corresponding participant work area;
providing a moderator work area having a plurality of panels on a moderator workstation comprising at least one moderator input-device, the at least one moderator input-device being adapted to define moderator images that are then included in the moderator work area and to select moderator images that are then simultaneously included in each of the participant work areas;
using the moderator workstation to identify a panel not currently displayed in a selected participant work area;
transmitting a request message from the moderator workstation to the corresponding participant workstation for the identified panel; and
transmitting the identified panel from the corresponding participant workstation to the moderator workstation in response to the request message.

53. The method of claim 52, wherein images placed on a participant work area at a participant workstation may be viewed only at that workstation unless a participant decides to permit them to be viewed from another workstation.

54. The method of claim 53, wherein a participant can implement a decision to permit an image placed on a participant work area to be viewed at another workstation by setting a flag.

55. The method of claim 53, wherein a participant can implement a decision to permit an image placed on a participant work area to be viewed at another workstation by actively causing information corresponding to the image to be transmitted to another workstation.

56. An interactive learning method, comprising:
providing a participant work area on each of a plurality of participant workstations having at least one corresponding participant input-device and participant display, each of the participant input-devices being adapted to define participant images that are then included in the corresponding participant work area;
providing a moderator work area on a moderator workstation comprising a moderator input-device and moderator display, said moderator work area including a shared work area where images may be placed by the moderator and participants, the moderator input-device being adapted to define moderator images that are then included in the shared work area and in each of the participant work areas, the moderator images generally displayed superimposed on participant images in the participant work areas; and
avoiding collisions by permitting a participant to place a first image in the shared work area visible to the moderator, the first image having a corresponding image in the participant work area that is not visible to the moderator.

57. The method of claim 56, wherein a participant can implement a decision to permit an image placed on a participant work area to be viewed at another workstation by setting a flag.

58. The method of claim 56, wherein a participant can implement a decision to permit an image placed on a participant work area to be viewed at another workstation by actively causing information corresponding to the image to be transmitted to another workstation.

59. The method of claim 56, wherein the participant work area comprises a participant public work area and a private work area, wherein images placed on the participant public work area are generally displayed superimposed over images on the shared work area.

60. The method of claim 59, wherein a participant can place footnote images in the participant's public work area that are superimposed on the shared work area, the footnote images providing a link to corresponding images located elsewhere.

61. The method of claim 60, wherein the footnote images are implemented as hyperlinks which include functionality that causes the participant's workstation to display the corresponding images.

62. The method of claim 60, wherein the corresponding images located elsewhere comprise images placed on the participant's private work area.

63. An interactive learning method, comprising:
providing a plurality of participant work stations, each comprising:
at least one participant display device;
at least one input device;
a participant public scroll; and
a participant private scroll;
the at least one participant input device being adapted to permit the participant to create data structures on the participant public scroll and participant private scroll defining images that are displayed on the at least one participant display device;
providing a moderator work station, comprising:
at least one moderator display device;
at least one moderator input-device; and
a moderator public scroll;
the at least one moderator input device being adapted to create data structures on the moderator public scroll and each of the participant public scrolls defining images that are displayed on the at least one moderator display device and on each of the at least one participant display devices,
wherein the scrolls each comprise a plurality of panels, each panel comprising a plurality of objects created in a sequence; and
wherein the creation sequence of objects on a given panel of at least one of said scrolls is replayed in object-by-object fashion.

* * * * *